US008811814B2

United States Patent
Warren et al.

(10) Patent No.: US 8,811,814 B2
(45) Date of Patent: Aug. 19, 2014

(54) METHOD AND SYSTEM FOR CAMERA MODULE ALIGNMENT

(75) Inventors: Gary Warren, Aurora (CA); Darren Van Roon, Bowmanville (CA); Steve Steane, Courtice (CA); Reginald C. Grills, Oshawa (CA)

(73) Assignee: Flextronics AP, LLC, Broomfield, CO (US)

( * ) Notice: Subject to any disclaimer, the term of this patent is extended or adjusted under 35 U.S.C. 154(b) by 91 days.

(21) Appl. No.: 13/436,516

(22) Filed: Mar. 30, 2012

(65) Prior Publication Data

US 2013/0142505 A1 Jun. 6, 2013

Related U.S. Application Data

(60) Provisional application No. 61/567,044, filed on Dec. 5, 2011.

(51) Int. Cl.
*G03B 17/02* (2006.01)
*H01R 13/514* (2006.01)

(52) U.S. Cl.
USPC .......................... 396/541; 439/731; 348/374

(58) Field of Classification Search
USPC .................. 396/541–542, 535; 348/373–374; 439/731, 32, 79, 541.5, 629, 687, 696
See application file for complete search history.

(56) References Cited

U.S. PATENT DOCUMENTS

| | | | | |
|---|---|---|---|---|
| 6,592,268 | B2 * | 7/2003 | Chen et al. | 385/88 |
| 6,994,577 | B2 * | 2/2006 | Margulis et al. | 439/247 |
| 7,988,371 | B2 * | 8/2011 | Aoki et al. | 396/529 |
| 2005/0285973 | A1 | 12/2005 | Singh et al. | |
| 2006/0216014 | A1 | 9/2006 | Morinaga et al. | |
| 2007/0041726 | A1 | 2/2007 | Lee | |
| 2007/0230950 | A1 * | 10/2007 | Huang | 396/541 |
| 2008/0159734 | A1 * | 7/2008 | Westerweck et al. | 396/541 |
| 2009/0021624 | A1 | 1/2009 | Westerweck et al. | |
| 2009/0252489 | A1 | 10/2009 | Huang et al. | |
| 2010/0098394 | A1 | 4/2010 | Ishihara et al. | |

FOREIGN PATENT DOCUMENTS

JP   2004063358 A   *   2/2004   ........... H01R 13/629

OTHER PUBLICATIONS

PCT Invitation to Pay Additional Fees and, Where Applicable, Protest Fee with partial International Search Report dated Apr. 10, 2013 for PCT/US2012/067099, International Filing Date: Nov. 29, 2012.

* cited by examiner

*Primary Examiner* — Christopher Mahoney
(74) *Attorney, Agent, or Firm* — Volpe and Koenig, P.C.

(57) ABSTRACT

Described herein is a system and method for camera module alignment. A camera module comprises a terminal block and an endcap with a connector shroud. The terminal block includes flexible terminal legs connected to a circuit board and terminal pins for connection with an external connector through the connector shroud. The terminal block includes alignment ribs and an endcap includes alignment pockets. Placement of the alignment ribs into the alignment pockets flexes the flexible terminal legs, moves the terminal block across the circuit board surface and aligns the terminal pins for connection with the external connector through the connector shroud.

18 Claims, 7 Drawing Sheets

Connector Header 300

PCB 305

Figure 3A

Hole Cut in Housing 310

Housing 315

Figure 3B

Terminal
Block 400

PCB 405

Figure 4A

Mating Connector
Interface
Geometry 410

METHOD AND SYSTEM FOR CAMERA MODULE ALIGNMENT

CROSS REFERENCE TO RELATED APPLICATIONS

This application claims the benefit of U.S. Provisional Application No. 61/567,044, filed Dec. 5, 2011, the content of which is hereby incorporated by reference herein as if fully set forth.

FIELD OF INVENTION

This application is related to packaging of camera modules.

BACKGROUND

The manufacturing of camera modules requires alignment of a number of parts including a lens with an image capturing device, and terminal pins with an external connector. Due to the number of parts and interfaces involved, there is significant tolerance build up that resists or prevents proper alignment.

SUMMARY

Described herein is a system and method for camera module alignment. A camera module comprises a terminal block and an endcap with a connector shroud. The terminal block includes flexible terminal legs connected to a circuit board and terminal pins for connection with an external connector through the connector shroud. The terminal block includes alignment ribs and an endcap includes alignment pockets. Placement of the alignment ribs into the alignment pockets flexes the flexible terminal legs, moves the terminal block across the circuit board surface and aligns the terminal pins for connection with the external connector through the connector shroud.

BRIEF DESCRIPTION OF THE DRAWINGS

A more detailed understanding may be had from the following description, given by way of example in conjunction with the accompanying drawings wherein.

DETAILED DESCRIPTION

It is to be understood that the figures and descriptions of embodiments of the camera module packaging have been simplified to illustrate elements that are relevant for a clear understanding, while eliminating, for the purpose of clarity, many other elements found in typical electronics packaging. Those of ordinary skill in the art may recognize that other elements and/or steps are desirable and/or required in implementing the camera module packaging. However, because such elements and steps are well known in the art, and because they do not facilitate a better understanding of the camera module packaging, a discussion of such elements and steps is not provided herein.

The non-limiting embodiments described herein are with respect to camera modules. The embodiments and variations described herein, and/or shown in the drawings, are presented by way of example only and are not limiting as to the scope and spirit. The camera modules may be used in a number of applications including automobile applications and other applications having environmental exposure.

Figure 1:
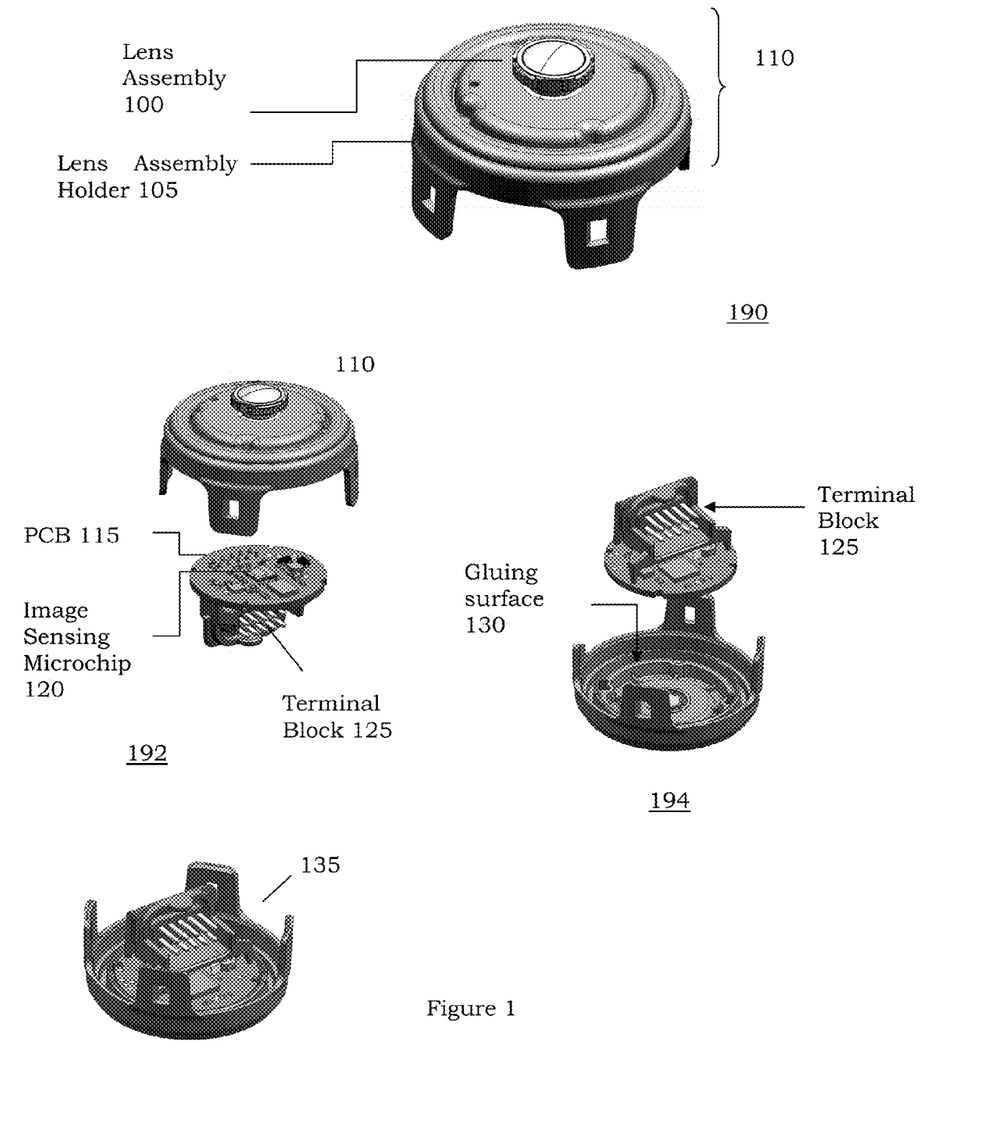
FIG. 1 is a sequence showing an assembled lens holder.

Described herein is assembly and alignment processing for camera modules. Camera module assembly and manufacturing requires alignment of a number of parts. Alignment of the lens with the image capturing device or chip is one such example. FIG. 1 shows an example sequence for assembling an embodiment of a lens assembly holder with an image capture device. Initially, a camera lens assembly 100 is threaded in to a lens assembly holder 105 (190) to form partially assembled universal camera component 110. The threading action also controls the focus of the camera lens assembly 100. A printed circuit board (PCB) 115 or equivalents thereof with an image sensing/capturing device or microchip 120 may then be attached to the partially assembled universal camera component 110 (192). A terminal block 125 may be attached to one side of the PCB 115.

In particular, the PCB 115 with the image sensing microchip 120 and terminal block 125 is attached to a gluing surface 130 of the partially assembled universal camera component 110 using, for example but not limited to, heat activated glue (194) to form an assembled universal camera component 135. Alignment of the image sensing/capturing device 120 with the camera lens assembly 100 is nominally achieved using computer numerically controlled (CNC) machinery. The glue is cured to maintain this alignment.

Figure 2:
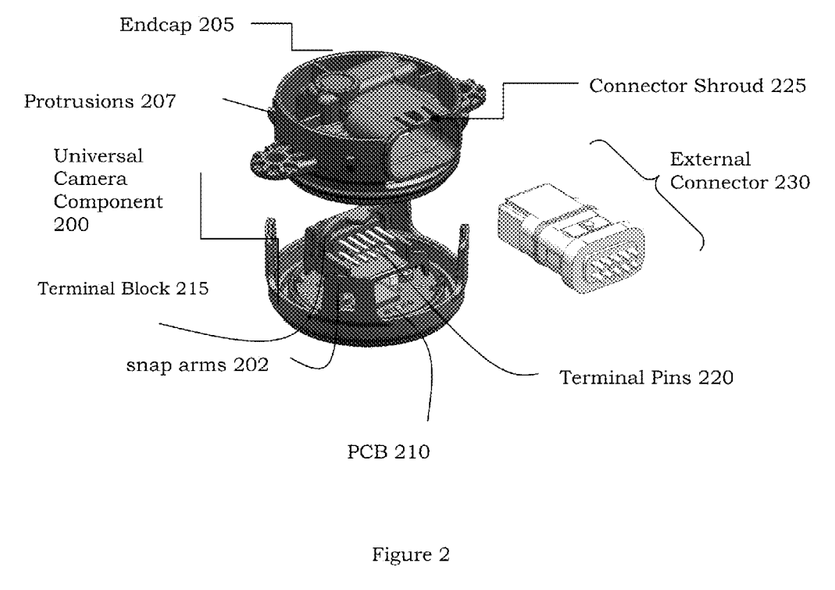
FIG. 2 is an embodiment of an assembled lens holder and an endcap.

As shown in FIG. 2, camera module assembly is completed by affixing a universal camera component 200 to an interchangeable mounting/connector component or endcap 205. As described hereinabove, the universal camera component 200 includes a PCB board 210 with an image sensor (not shown), and a terminal block 215 having terminal pins 220. The endcap 205 may include a connector shroud 225. The endcap 205 has the mating connectors interface geometry, i.e., the connector shroud 225, which permits it to connect to an external connector 230. The universal camera component 200 and endcap 205 also includes, but is not limited to, snap arms 202 and protrusions 207, respectively, which interlock and fasten together the universal camera component 200 and endcap 205.

Affixing the universal camera component 200 to the interchangeable mounting/connector component or endcap 205 presents a number of issues. In particular, due to the number of parts and interfaces involved, there may be significant tolerance build up that resists or prevents proper alignment. In an example issue, the assembled camera module, i.e., the universal camera component 200 affixed to the interchangeable mounting/connector component or endcap 205, needs to be sealed against the exterior environment. This in turn requires that external connector 230 be a sealed connector. The external connector 230 is plugged into, aligned by, and needs to seal against the connector shroud 225, which is part of the endcap 205.

In another example issue, a standard terminal block, (which holds the terminal pins), is affixed to the PCB, which in turn is rigidly affixed to the lens holder after being aligned to the lens. The terminal pins 220 require precise alignment to the mating external connector's terminal receptacles. This creates a large tolerance stack up, potentially resisting the alignment of the terminal pins 220 to the mating external connector terminal receptacles.

Figure 3A:
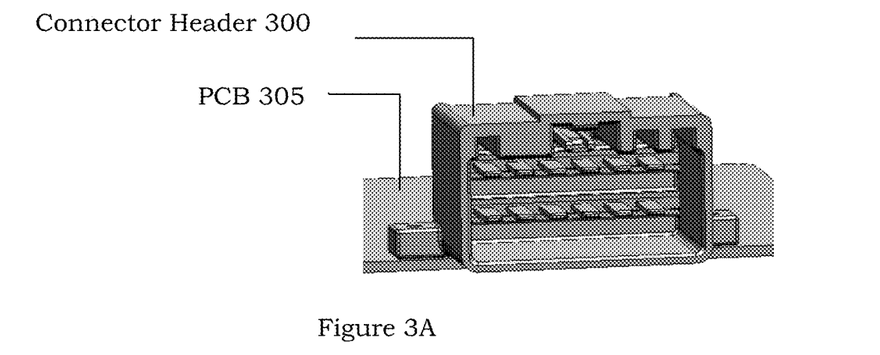
FIG. 3A is an embodiment of a connector header and FIG. 3B is a connector header with housing.
Figure 3B:
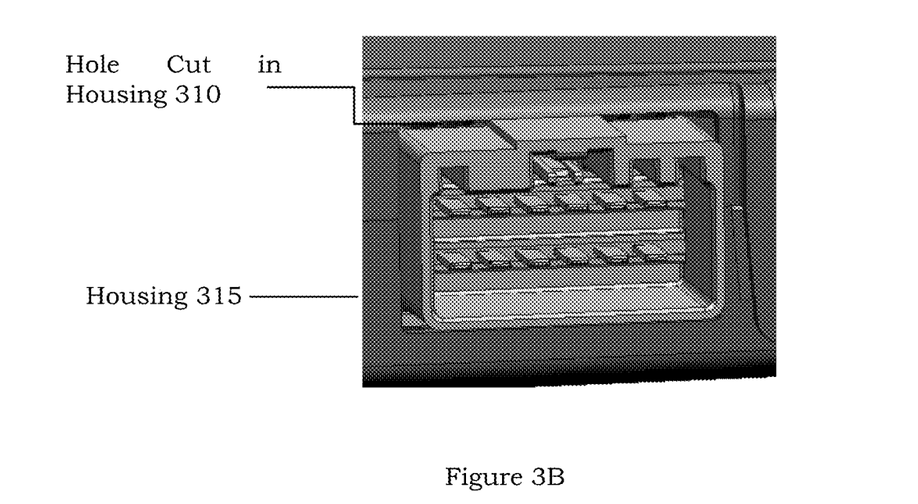

FIG. 3A shows a standard connector header 300 that is soldered directly onto a PCB 305. The mating connector interface geometry, (i.e., a connector shroud), is designed in to the standard connector header 300. This is typically an "off the shelf" component. The connection to the PCB 305 is rigid, and will not be movable. As shown in FIG. 3B, this type of connection typically requires a hole 310 cut in the PCB's housing 315 for purposes of access. This hole 310 is difficult to seal against water intrusion. This standard connector header 300 resists at least alignment and sealability.

Figure 4A:
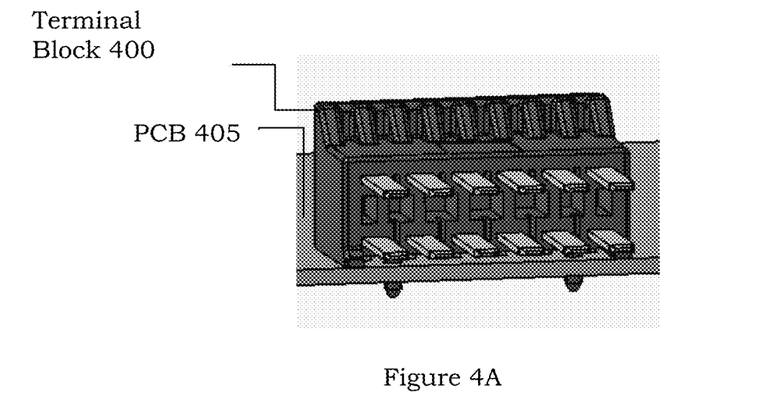
FIG. 4A is an embodiment of a terminal block and FIG. 4B is an embodiment showing a housing with mating connector interface geometry, or connector shroud incorporated.
Figure 4B:
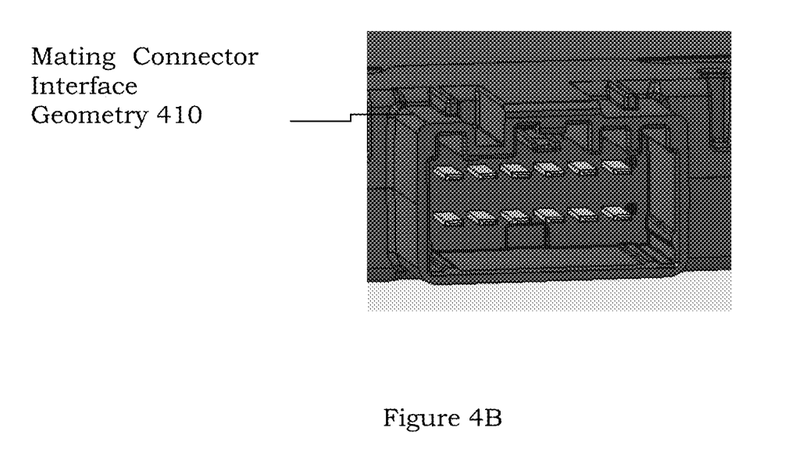

FIG. 4A shows a standard connector terminal block 400 that is typically soldered directly to the PCB 405. The standard connector terminal block 400 does not have the mating connector interface geometry designed in to it and are typically custom made. The connection to the PCB is rigid, and will not be movable. As shown in FIG. 4B, this type of connection typically has the mating connector interface geometry 410, (i.e., connector shroud), designed into the PCB's housing. This type of connection is capable of a water tight seal. This connector terminal block resists at least alignment.

Figure 5A:
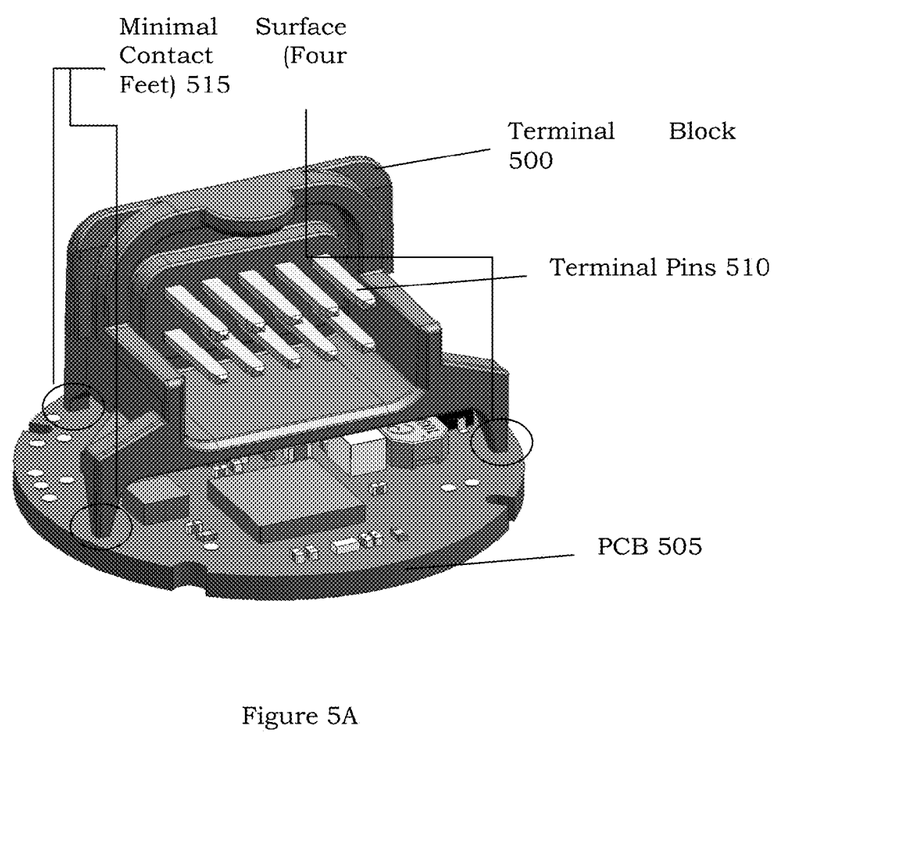
FIG. 5A shows a front view of an embodiment of a terminal block.
Figure 5B:
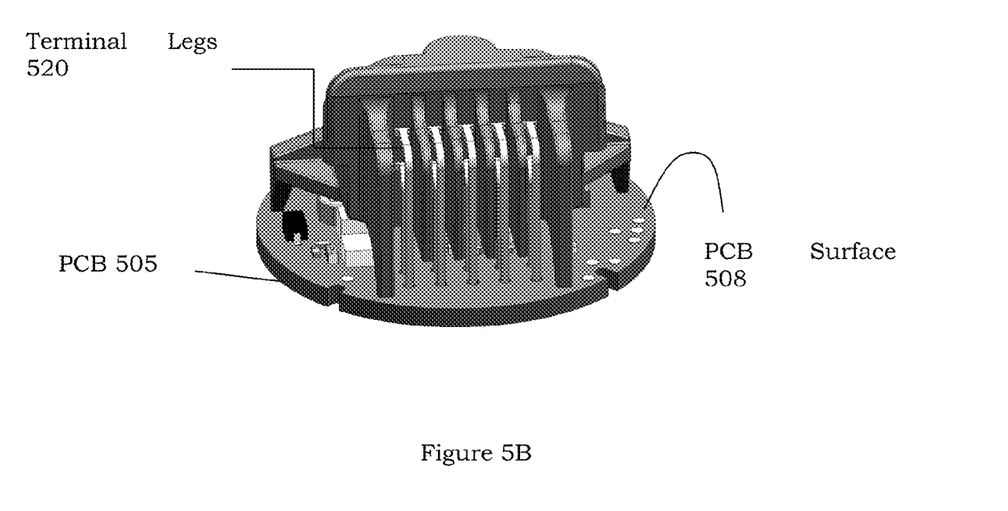
FIG. 5B shows a rear view of an embodiment of a terminal block.
Figure 5C:
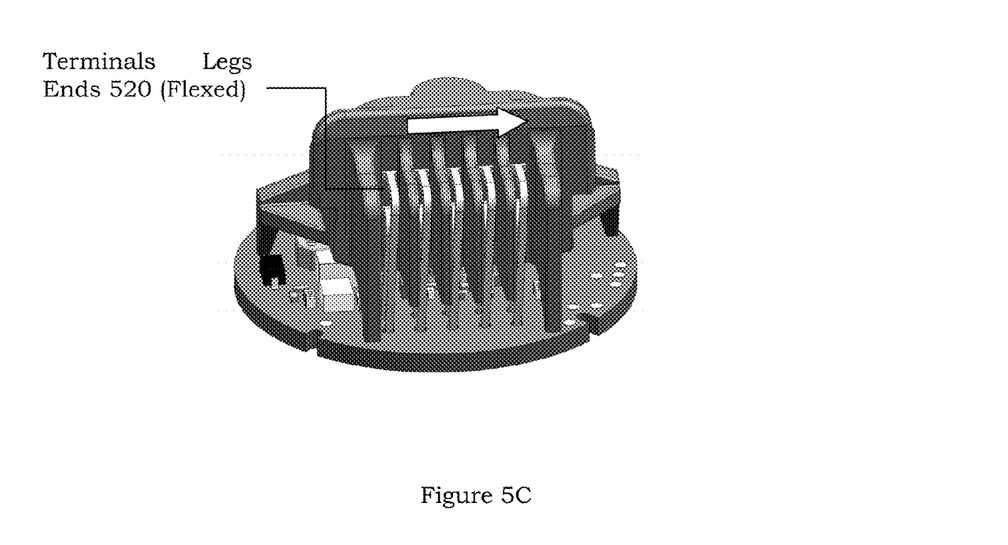
FIG. 5C shows a rear view of a terminal block with flexed terminal legs.

FIGS. 5A-5C show multiple views of the alignment method and variable position system. In particular, FIG. 5A shows a front view of a terminal block 500 affixed to a PCB 505. Terminal block 500 includes multiple terminal pins 510 for connection to an external connector (not shown) and multiple feet 515 that have minimal surface contact with the PCB 505. FIG. 5B shows a rear view of the terminal block 500 that includes multiple terminal legs 520 that are connected to PCB 505. The terminal legs 520 may be soldered to the PCB 505 or via other similar connection methods. The terminal legs 520 may be metal or of other materials suitable for terminals. As shown in FIG. 5B, there is reduced support surrounding the terminal legs 520 to allow for flexing as described herein below. FIG. 5C shows a rear view of the terminal block 500 with the terminal legs 520 in a flexed position as described herein below.

As shown in FIGS. 5A-5C, the terminal block 500 includes a number of features which allow it to "float" in its position across the PCB's surface 508. That is, the terminal block 500 may slide along the surface 508 of the PCB 505 to enable alignment. This "floating" will compensate for the tolerance stack built up between the terminal pins 510 on the terminal block 500 and the terminal receptacles on an external connector, (not shown but see FIG. 2). The terminal block 500 is implemented with reduced support and with extra space surrounding the terminal legs 520 to permit flexing. In other words, this will enable the terminal body 500 to move a small amount, (enough to align the terminal pins 510 to the mating connector's terminal receptacles, which are aligned to the connector shroud on the endcap, (not shown but see FIG. 2), after the terminal legs 520 have been soldered to the PCB 505. The long flexible shape of the terminal legs 520 also ensure there is only minimal stress on the solder joints during movement. Minimal terminal block body 500 to PCB 505 contact provides reduced surface friction for transverse movement, (i.e., feet 515 are of minimal size).

Figure 6A:
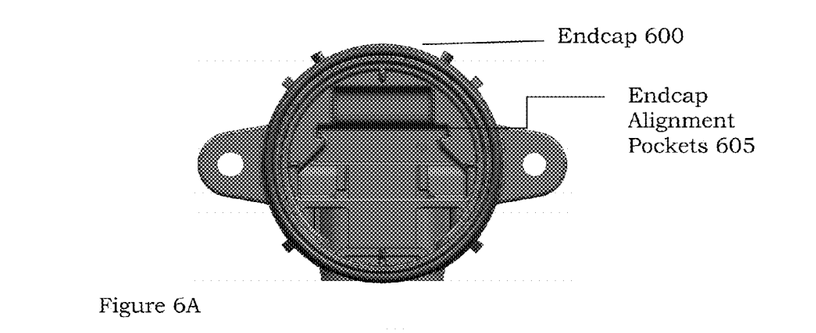
FIG. 6A shows an internal bottom view of an embodiment of an endcap.
Figure 6B:
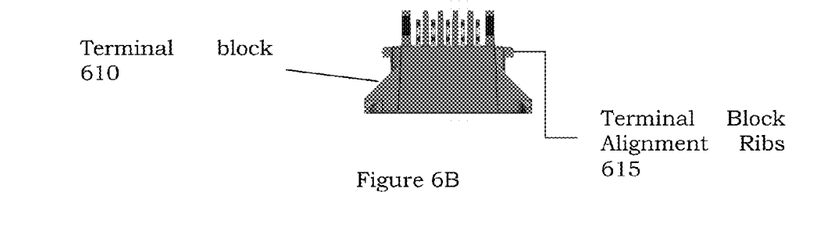
FIG. 6B shows a bottom view of an embodiment of a terminal block.
Figure 6C:
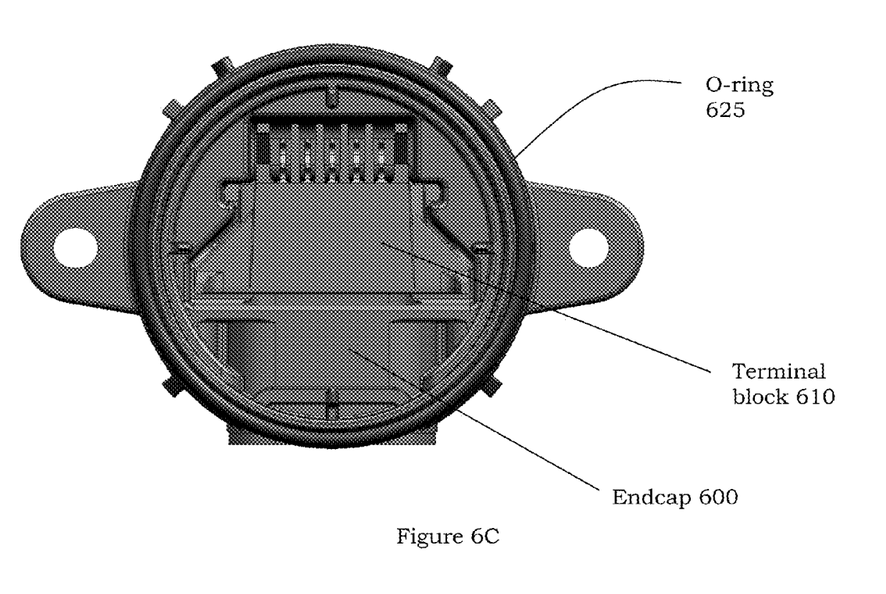
FIG. 6C shows an embodiment of an endcap with an affixed terminal block.

FIGS. 6A-6C show views of an endcap to terminal block alignment. In particular, FIG. 6A shows an internal bottom view of an endcap 600 that includes at least alignment pockets 605. FIG. 6B shows a bottom view, (as viewed from down at the PCB perspective), of a terminal block body 610 that includes at least alignment ribs 615 and FIG. 6C shows an endcap 600 aligned to the terminal block 610 as described herein with, but not limited to, an o-ring 625 to radially seal against environmental conditions.

As shown in FIGS. 6A-6C, the endcap 600 aligns the terminal block 610 to the connector shroud, (not shown but see FIG. 2). The alignment ribs 615 guide the terminal block 600 into the endcap alignment pockets 605. The alignment ribs 615 will move the terminal block body 610 across a PCB, (not shown but see FIGS. 5A-5C), a small amount due to the features described herein above with respect to FIGS. 5A-5C. The alignment ribs 615 will also secure the terminal block 610 in the endcap 600, resisting the external connector insertion and removal forces acting upon it.

The methods described herein are not limited to any particular element(s) that perform(s) any particular function(s) and some steps of the methods presented need not necessarily occur in the order shown. For example, in some cases two or more method steps may occur in a different order or simultaneously. In addition, some steps of the described methods may be optional (even if not explicitly stated to be optional) and, therefore, may be omitted. These and other variations of the methods disclosed herein will be readily apparent, especially in view of the description of the camera module described herein, and are considered to be within the full scope of the invention.

Although features and elements are described above in particular combinations, each feature or element can be used alone without the other features and elements or in various combinations with or without other features and elements.

What is claimed is:

1. A camera module, comprising:
   a terminal block including flexible terminal legs connected to a circuit board;
   the terminal block including alignment ribs; and
   an endcap with alignment pockets, wherein placement of the alignment ribs into the alignment pockets flexes the flexible terminal legs and moves the terminal block across a surface of the circuit board to permit connection with an external connector.

2. The camera module of claim 1, further comprising:
   the terminal block having minimal circuit board surface contact feet for stabilization.

3. The camera module of claim 1, further comprising:
   the circuit board including an image sensor.

4. The camera module of claim 1, wherein the terminal block includes terminal pins for connecting with the external connector.

5. The camera module of claim 4, wherein the endcap includes a connector shroud that permits the external connector to connect to the terminal pins.

6. The camera module of claim 5, wherein the terminal pins are aligned to the connector shroud.

7. The camera module of claim 1, wherein the circuit board is affixed to a lens holder module which includes a lens aligned to an image capture device on the circuit board.

8. A device, comprising:
   a first module including a terminal block movably connected to a circuit board, wherein the terminal block includes alignment ribs; and
   a second module including alignment pockets and a connector port, wherein placement of the alignment ribs into the alignment pockets moves the terminal block across a surface of the circuit board to align with the connector port.

9. The device of claim 8, wherein the terminal block further includes terminal legs movably connected to the circuit board.

10. The device of claim 8, further comprising:
the terminal block minimally contacting the circuit board.

11. The device of claim 8, wherein the circuit board includes an image sensor.

12. The device of claim 8, wherein the image sensor is aligned with a lens in the first module.

13. The device of claim 8, wherein the terminal block includes terminal pins for connecting with an external connector.

14. The device of claim 8, wherein the connector port permits an external connector to connect to terminal pins supported by the terminal block.

15. The device of claim 8, wherein the terminal block includes terminal pins aligned to the connector port.

16. The device of claim 8, wherein the first module includes snap arms and the second module includes protrusions that interlock the first module and second module in an aligned state due to the placement of the terminal block alignment ribs into the alignment pockets.

17. The device of claim 8, wherein the terminal block includes multiple feet that minimally contact a surface of the circuit board and provide stabilization.

18. The device of claim 8, further comprising:
an o-ring to radially seal the fastened together first module and second module against environmental conditions.

* * * * *